United States Patent [19]

Scudder et al.

[11] 4,144,365

[45] Mar. 13, 1979

[54] WREATH

[75] Inventors: Monty Scudder, Bordentown-Chesterfield Rd., R.R. 2, Box 192, Trenton, N.J. 08620; Barclay A. Townsend, Wrightstown, N.J.

[73] Assignee: Monty Scudder, Trenton, N.J.

[21] Appl. No.: 828,451

[22] Filed: Aug. 29, 1977

[51] Int. Cl.² .............................................. A41G 1/04
[52] U.S. Cl. .......................................... 428/10; 24/28; 24/230 R; 403/215; 428/27
[58] Field of Search ................ 24/230 R, 230 BC, 28; 428/7, 10, 27; 403/215, 300, 301; 248/27.8; 362/122

[56] References Cited

U.S. PATENT DOCUMENTS

| 202,556 | 4/1878 | Lane | 403/215 |
|---|---|---|---|
| 1,414,838 | 5/1922 | Street | 24/230 R |
| 1,694,125 | 12/1928 | Jopson | 428/10 |
| 1,990,721 | 2/1935 | Williams | 403/215 |
| 2,258,442 | 10/1941 | Brenner | 428/10 X |
| 2,855,713 | 10/1958 | Jaremo | 428/10 X |
| 2,986,787 | 6/1961 | Ackermann | 24/28 |
| 3,046,685 | 7/1962 | Blum | 428/10 X |
| 3,110,647 | 11/1963 | Tong | 428/10 X |
| 3,435,642 | 4/1969 | Del Pesco | 24/230 R X |
| 3,462,807 | 8/1969 | Marquardt | 24/230 R |
| 3,543,356 | 12/1970 | Zimmermann | 24/230 R |
| 3,709,533 | 1/1973 | Walters | 46/409 |
| 4,077,697 | 3/1978 | Yates | 403/215 X |

FOREIGN PATENT DOCUMENTS 735988  8/1955  United Kingdom ...................... 248/27.8

*Primary Examiner*—Henry F. Epstein
*Attorney, Agent, or Firm*—Albert Sperry; Frederick A. Zoda; John J. Kane

[57] ABSTRACT

A decorative wreath having, in its finished form, a circular shape and composed of an annular core means enclosed and concealed by a sheath of decorative material, either natural or artificial. The core means is of sectional form, comprising a series of like sections each of which includes a core element of bendable wire material extending axially of, and secured to, the decorative sheath or covering. The core element has mating or complementary male and female connectors at its respective, opposite ends. The connectors comprise an undulant crimp on one end of each core element, terminating in a laterally projecting locking finger, extendable into a sleeve secured to the other end of an adjacent core element. This sleeve is formed with a side opening receiving the finger, which is placed under spring tension responsive to insertion of undulant, crimped part into the sleeve.

8 Claims, 7 Drawing Figures

U.S. Patent    Mar. 13, 1979    4,144,365
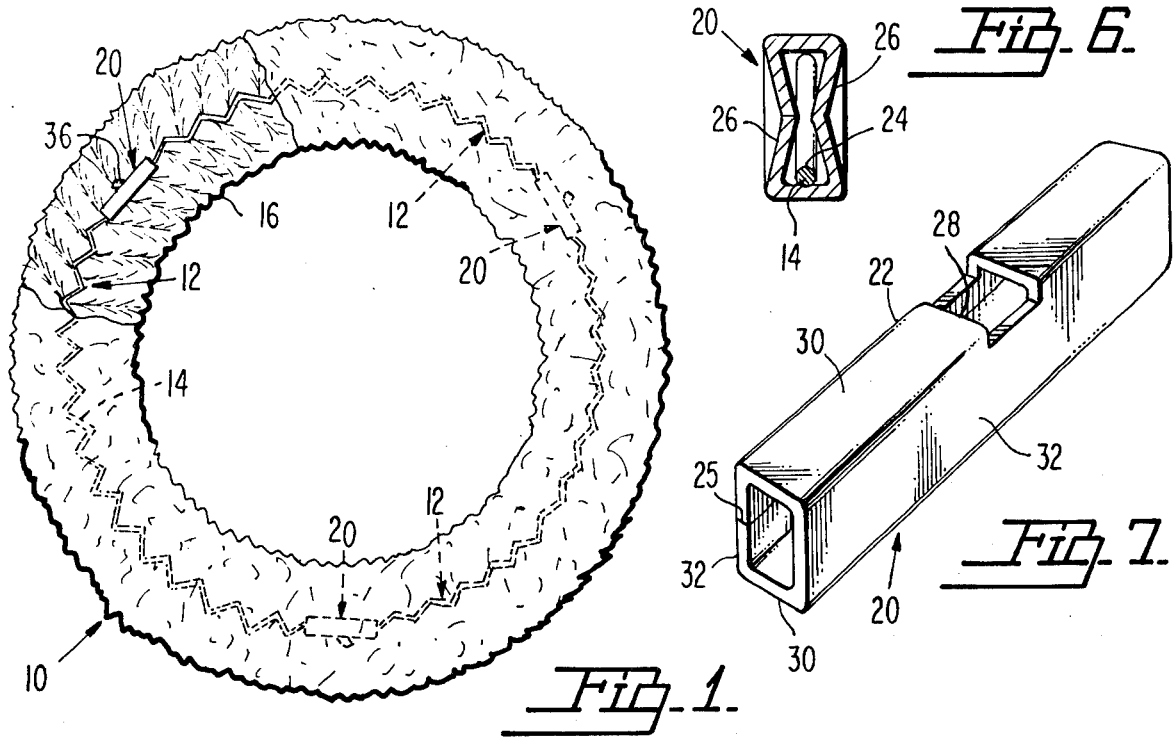
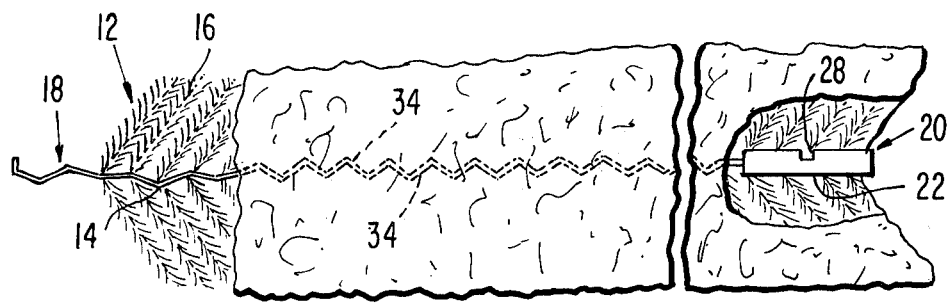
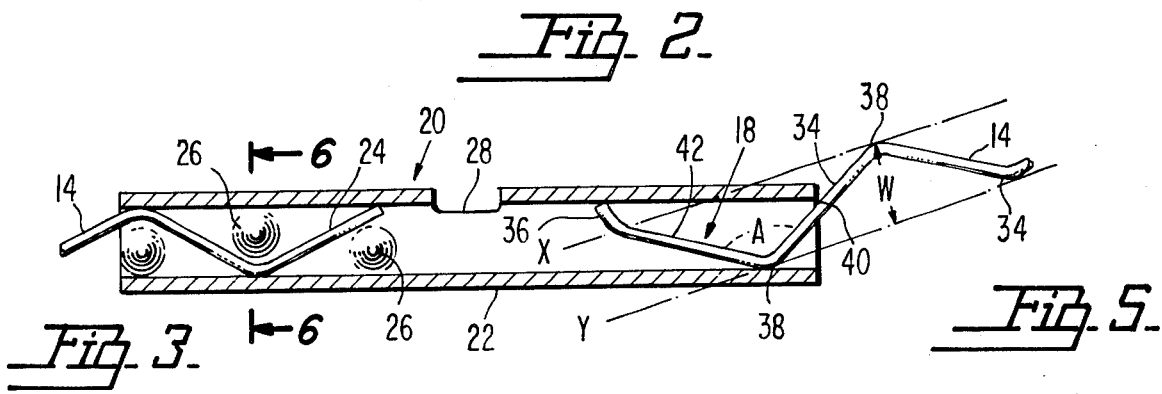
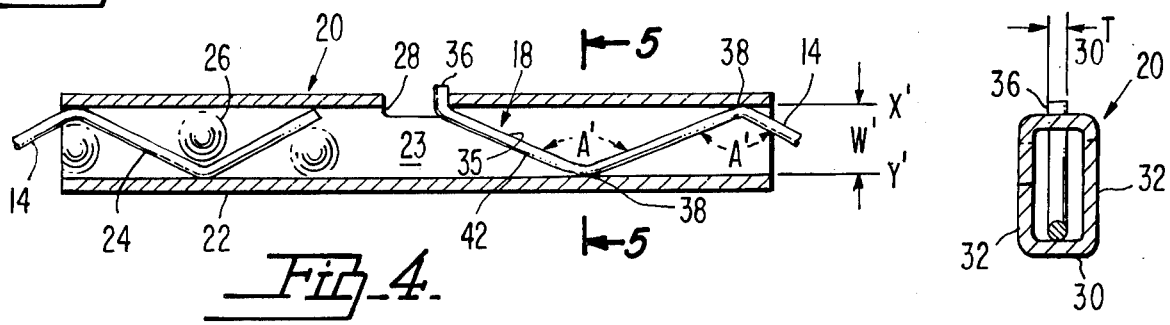

WREATH

BACKGROUND OF THE INVENTION

1. Field of the Invention

The invention relates generally to the field of ornamental or decorative wreath construction, particularly those fashioned for sale during the Christmas season. More specifically, the invention has reference to a sectional wreath, comprised of initially straight, like sections, which can be assembled in any desired number to fashion wreaths from a selected, varying number of sections, to produce wreaths of correspondingly selected, varying sizes. In a more specific sense the invention encompasses a novel connection or coupling between adjacent sections for facilitating final assembly of the wreath.

2. Description of the Prior Art

The prior art includes sectional wreaths as shown, for example, in Blum U.S. Pat. No. 3,046,685, and Tong U.S. Pat. No. 3,110,647. In the prior art as represented by way of example in the specified patents, male and female connecting means are provided at the opposite ends of the core elements of the initially straight sections, for connecting the sections in end-to-end relationship to produce the completed, annular wreath. However, in some instances the connecting means has not served with desired efficiency in producing a true lock between the connected ends of adjacent core elements, as a result of which the core elements have tended to separate after final assembly of the wreath. And, in other instances expensive wire forms or plastic, molded shapes have been required to effect the connections, also an undesirable feature in that such forms and shapes require low manufacturing tolerances and expensive tooling.

SUMMARY OF THE INVENTION

The invention may be briefly summarized as comprising an annular holiday wreath of the sectional type, initially comprising a plurality of straight, like sections all of which would be so designed as to be packed compactly in a shipping container, in far less space than is normally required for the shipping of completed, annular wreaths, the shape of which obviously results in wasted, hollow spaces in the shipping containers during transport thereof to their destinations from the source of manufacture. The sections may thus be of modular characteristics, in that all the sections can be assembled in a selected number in fashioning a completed wreath of a particular, desired circumference.

The invention may be further summarized as incorporating core elements, enclosed by sheaths of natural or artificial decorative material, said core elements being of conventional construction intermediate their ends, so as to adapt the invention for basically conventional manufacturing processes, wherein the sheaths of decorative material are attached to core wires or the like, through the use of known, efficient, and inexpensive manufacturing methods. The opposite ends of the core elements, however, are provided with novel male and female, mating connecting means, so designed as to permit the assembler to connect adjacent sections end-to-end merely by inserting the end of one core element into a sleeve provided in the end of an adjacent core element. Responsive to the act of insertion, a laterally projecting locking finger is placed under spring tension, such as to cause it to spring or snap into a locking opening provided in the sleeve.

BRIEF DESCRIPTION OF THE DRAWING

FIG. 1 is a front elevational view of a holiday wreath in its completed form, made according to the present invention, a portion of the wreath being illustrated in longitudinal section to disclose the connection between adjacent sections of the wreath;

FIG. 2 is an enlarged view, partly in side elevation and partly in longitudinal section, of one of the wreath sections, a portion being broken away;

FIG. 3 is a still further enlarged, detail, longitudinal sectional view illustrating the connecting means provided at the end of a core element, with the end of an adjacent core element partially inserted within said connecting means during the process of connecting the adjacent core elements;

FIG. 4 is a view like FIG. 3 in which the adjacent core elements are shown in fully connected relationship;

FIG. 5 is a transverse sectional view on the same scale as FIG. 4, taken substantially on line 5—5 of FIG. 4;

FIG. 6 is a transverse sectional view, on the same scale as FIG. 3, taken on line 6—6 of FIG. 3, showing the means for permanently connecting the sleeve to the core element; and FIG. 7 is a perspective view on an enlarged scale, of the connecting sleeve per se.

DESCRIPTION OF THE PREFERRED EMBODIMENT

As previously noted herein, it is known to provide wreaths of sectional construction, and in FIG. 1 there has been illustrated a wreath of this type, the wreath being generally designated 10 and being comprised of a plurality of identically constituted wreath sections generally designated 12. The sections are connected end-to-end, to provide an annular, endless wreath construction, ready for use, and in accordance with the present invention, a novel means is provided for effecting the connection of each wreath section to an adjacent section, with a view to permitting the connection to be made with maximum speed and ease, an without requirement of special tools, while still fashioning the connection in such a way as to permit it to be manufactured at a minimum cost. Each wreath section is formed as shown in FIG. 2, and includes an elongated core element 14 which preferably is formed of a wire material, having connected thereto a decorative sheath 16. The sheath 16 can be composed either of natural or artificial material, both being well known in the art of holiday wreath manufacture. The manner of connecting the sheath, or component parts of the sheath, to the core element is not illustrated in the drawing, since this is completely conventional and can be of various modes employed in the art. The means for connecting the sheath material to the core element will depend, as will be understood, upon the specific nature of the sheath components, that is, artificial components are secured to a core element in certain ways according to the material and shape of said components, while natural holly or evergreen materials require other modes of connection to the core element. Any of various ways of connecting the sheath to the core element may be employed, thus, including, but not restricted to, those methods shown in the prior art patents mentioned above, the disclosures of which may be considered as incorporated herein by reference, for this purpose.

In any event, the invention resides in the particular connections utilized for joining adjacent sections of the wreath in end-to-end relationship to form the completed wreath shown in FIG. 1. To this end, there is provided, at opposite ends of each core element, male and female connecting means 18,20 respectively.

Considering first the construction of the connecting means 20, this includes an elongated sleeve 22, which can be readily formed from an inexpensive sheet of metal material, bent upon itself to provide a long, tubular member shown to particular advantage in FIGS. 3 and 4, having a continuous, straight, axial passage 23 opening upon both ends of the sleeve. The sleeve, by reason of being formed from sheet metal material, has a longitudinal seam 25 formed therein (see FIG. 7), but it will be understood that if desired, the sleeve could be formed of a seamless material, so long as it has, when completed, the desired longitudinal and cross-sectional shape needed for the purpose of carrying out the invention.

At one end 24 of the core element 14, the sleeve is fixedly secured to the core element in the manner shown in FIGS. 3 and 6. The end 24 is formed with undulations, and indeed, as will presently appear said undulations can extend through the entire length of the core element for the purpose of imparting a desired rigidity thereto and for the further purpose of facilitating assembly of the decorative sheath therewith. For the purposes of the present invention, it is mainly important that the undulations be provided at the end portions of the core element, particularly that end portion that is inserted into the sleeve of an adjacent core element during the final assembly of the wreath.

The end of the core element designated 24, to which the sleeve is connected, is inserted in one end of the axial passage 23 during initial manufacture of each wreath section 12. When so inserted from the left, viewing the same as in FIGS. 3 and 4, it is extended into the sleeve to a location near and short of the midlength point of the sleeve, in a typical, preferred embodiment. Then, any of various known manufacturing expedients can be employed for the purpose of effecting a permanent, fixed connection of the sleeve to the end 24. In the illustrated example, the connection is produced by staking of the sleeve and the inserted end 24 of the core element as shown at 26. In this arrangement, punches or similar means are employed, after insertion of the end 24, pressing the opposite sides of the sleeve toward each other, in the manner shown in FIG. 6, in the areas intervening between the undulations of the inserted end 24 of the core element, thus to secure said end 24 within the sleeve, permanently, with the sleeve extending in substantial longitudinal alignment with the core element and projecting for substantially half the sleeve length beyond the extremity of the core element end 24.

Other means can be employed for securing the sleeve to the end 24 in the desired, permanent relationship.

Intermediate its ends, the sleeve is formed with a side opening 28, comprising a locking opening for receiving a projection formed upon the end of the adjacent wreath section to be connected to the sleeve. Referring to FIG. 5, it should also be noted that in the preferred embodiment, the sleeve is of rectangular cross-section, although it could be of other, non-circular cross section. In the illustrated example, thus, the sleeve is formed with opposed sidewall portions 30, comprising first wall portions that are relatively narrow in width and which appear in the illustrated example at the top and bottom of the sleeve, said first wall portions being integrally joined by opposed, second wall portions 32 that are greater in width than the first wall portions 30, thus to impart the desired rectangular cross-sectional configuration to the sleeve. This causes the axial passage 23 to comprise a relatively narrow passage or bore through the entire length of the sleeve, a construction which is of importance because it is desired to assure, in the assembly of the completed wreath, facility in aligning the locking projection with a side opening, along with a suitable arrangement that will prevent relative rotation of the core element and the associated sleeve to which it is to be locked.

The male connecting means, for this purpose, is formed with a series of undulations 34, defining an undulant crimped part 35 upon the core element. The crimped part, in a preferred embodiment, is so designed that prior to insertion of said part within the sleeve, its width W is slightly greater than the corresponding transverse dimension or width W' of the sleeve. Width W, in another sense, can be considered as the dimension of the crimped undulant part 35, taken on a line perpendicular to the long axis of the core element, and extending between parallel imaginary lines X,Y tangent to the opposed, oppositely projecting crest portions 38 of the undulations 34 of said crimped part 35.

It may also be noted by reference to FIG. 3 that projecting laterally of the crimped part, beyond the space defined between the lines X,Y is a locking projection or finger 36 formed upon the extremity of the crimped part, and adapted to engage in the locking opening 28 of the sleeve.

Referring to FIG. 5, the narrowing of passage 23, during manufacture of the sleeve, is effected to an extent sufficient to prevent relative rotation of the crimped part 35 and the sleeve, upon insertion of the crimped part within the sleeve. The wire has a thickness T, and the undulations are confined within the general plane of said thickness, the lesser cross-sectional dimension of the passage being slightly greater than thickness T, but being substantially less than the dimension W or W'. As a result, upon insertion of the crimped part within the sleeve, relative rotation of the sleeve and of the undulant, crimped part is effectively precluded. Further, the construction permits one to align the locking finger 36 with opening 38 preliminary to insertion of the crimped part within the sleeve, and such alignment is preserved until ultimately, the locking projection engages in the opening 28.

It should also be noted that prior to insertion in the sleeve, adjacent portions of each undulation define between them an angle A, which is a wide obtuse angle increased responsive to insertion of the crimped, undulant part within the sleeve.

In use, and assuming that two completed wreath sections, each formed as shown in FIG. 2, are to be connected in end-to-end relationship during the fashioning of a circular holiday wreath, one simply inserts the end 18 of the core element in the distal end of the sleeve of the adjacent wreath section, in the manner shown in FIG. 3. The wire material of which the core element is formed is relatively inexpensive, having, initially, relatively low spring tension. However, by inserting the crimped part 35 into the sleeve, one ultimately engages the crimped part against the end of the sleeve as shown at 40 in FIG. 3. The end of the sleeve exerts a cam action against the portion of the crimped part engaging the same, tending to open the angle A and placing the portions of the entering undulation that defines the angle A under tension. In effect, the crimped part is flattened to permit it to accommodate itself to the width W' of the sleeve, as it moves into the sleeve.

Further movement of the crimped part into the sleeve causes crests 38,38 of contiguous undulations to bear against the opposed wall portions 30, the angles A' defined opposite said crests being increased in the manner described above, over the initial angles A formed during the initial manufacture of the core element. As a result, the initial entering leg 42 of the crimped part, that is, that leg of the crimped part forming a portion of the undulation immediately adjacent projection 36, is placed under spring tension, tending to urge the projection 36 laterally outwardly. The result is that when the projection 36 reaches the opening 28, it snaps into the opening 28 under the spring tension imparted to the leg 42, and will be securely locked within said opening to complete the connection of the adjacent wreath sections to each other.

It is believed quite feasible that instead of connecting the sleeve permanently to one end of the core element, the wreath sections can be so formed that at both ends of the core element, the construction could be similar to that shown for the male, connecting means 18. In other words, each core element could be provided with male connecting means 18 at both ends. Then, the sleeves can be assembled with the core elements at the ultimate destination, by the worker performing the final assembly operation. One, thus, would press the sleeve onto one end 18 of a core element, causing the finger 36 thereof to lock into the sleeve. Then, the male connecting means 18 of an adjacent core element would be extended into the other end of the sleeve in the manner shown in FIG. 3, to produce the final connection. While this may take a few seconds more during the final assembly operation, it would reduce the cost of manufacture of the wreath sections, permitting the wreath sections to be shipped in a compact arrangement as described previously herein, with the sleeves being forwarded therewith, loosely packed in bulk form.

It is believed obvious, too, that instead of a single side opening 28, there could be a pair of such openings, in opposed relation to each other, formed in the respective wall portions 30. This would permit the user to select either of the openings for insertion of the finger 36 thereinto, thus to eliminate the necessity of orienting the respective sections with all the side openings 28 facing outwardly as in FIG. 1, or for that matter with all of them facing inwardly.

As will be apparent, the invention facilitates the shipping of wreath components in a minimum amount of space. Further, the invention provides an improved type of connecting means, adapted to make use of the conventional wire now employed in the manufacture of holiday wreaths. The wire need only be formed with the lateral projection at 36 at one or both extremities thereof, and is immediately adapted for association with the sleeve, which itself can be made of relatively low cost, flat sheet material. No requirement of special molded parts, complex or unusual wire forms, or other expensive expedients exists.

Most importantly, the invention permits assembly of a wreath of any selected diameter, by the use of the modular sections, with maximum speed and ease, it being readily appreciated that the insertion of the undulant crimped part into a sleeve, and movement therein to the point wherein the finger 36 registers with the opening 28, is all that is necessary. The locking action, when such registration condition exists, is immediate, sure, and automatic.

We claim:

1. In a decorative wreath of the type comprising an annular series of like wreath sections each of which includes a core element of bendable wire material, a decorative sheath on said element, and mating connecting means at the extremities of the element for connecting one end of one wreath section to the mating end of an adjacent, like section, the improvement comprising:
    (1) a sleeve with openings at opposite ends adapted for connection to one end of each core element and formed with at least one aperture on a side; and
    (2) a lateral projection on the other end of each core element springably tensioned to snap into said side aperture of the sleeve of an adjacent core element in response to insertion of said other end into the sleeve, said other end of the core element, and the projection on said other end, being comprised wholly of the wire material of which the core element is formed, said other end of the core element being formed with an angular leg of springy material having one end that terminates in said projection, said sleeve having opposite, transversely spaced walls in one of which said aperture is formed, the ends of the leg being engaged by the respective, opposite walls of the sleeve in the inserted position of the leg and being biased inwardly by said walls, whereby to place the leg under spring tension by the sleeve, in response to said insertion, in a direction tending to bias the projection laterally outwardly of the sleeve toward and into said aperture.

2. In a decorative wreath the improvement of claim 1 wherein the sleeve is non-circular in cross-section, said other end of the core element being shaped complementarily thereto and requiring alignment of the projection with said side aperture preliminary to insertion of said other end into the sleeve.

3. In a decorative wreath the improvement of claim 1 wherein said sleeve is of a flattened generally rectangular cross-sectional configuration and has opposed first wall portions joined by opposed second wall portions of a width greater than that of the first wall portions, said side aperture being formed in one of the first wall portions and said other end of the core element being restrained, by the second wall portions, against rotation from a position in which said projection is aligned with said side aperture.

4. In a decorative wreath the improvement of claim 1 wherein the sleeve is of a flattened, generally rectangular cross-section defining a narrow passage therethrough communicating intermediate its ends with said side aperture, said one end of the core element extending into and being fixedly secured within one end of said passage, the other end of the core element having an undulant part that includes the angular leg and that terminates in a laterally extending finger defining said projection, said undulant part being partially flattened within the other end of the passage so as to be placed under spring tension effective for snapping of said finger into said side aperture and springably retaining the same therein.

5. In a decorative wreath the improvement of claim 1 wherein the sleeve has a through axial passage opening at opposite ends of the sleeve, said side aperture being formed in the sleeve approximately at the midlength point of the sleeve, said ends of the core element being extendable into the sleeve through said opposite ends thereof, at least said other end of the core element being formed with an undulant crimp that includes said angular leg and that terminates in a laterally extending finger defining said projection, said undulant crimp having crest portions spaced apart longitudinally and transversely of the core element to an extent effective to place the undulant crimp of the core element under a spring tension sufficient to bias the finger into said side aperture of the sleeve of an adjacent wreath section, in response to the insertion of the undulant crimp into the passage of the sleeve of said adjacent section.

6. In a decorative wreath the improvement of claim 1 wherein the sleeve is of a flattened shape and the ends of the core element are of wave-like form, one of said ends of the core element being fixedly secured in one end of the sleeve, the other end being proportioned for insertion into the other end of the sleeve of a next adjacent section, said angular leg being a continuation of said wave-like form and being adapted to be placed under spring tension when said other end is so inserted, to an extent to exert a bias on said projection in a direction transversely of the core element for engagement in the side aperture of the sleeve of said next adjacent section.

7. In a decorative wreath the improvement of claim 1 wherein said other end of the core element is formed with a series of undulations one of which includes said angular leg and terminates in a laterally extending finger defining said projection, said undulations imparting a tension to the inserted core element effective to spring-bias the finger into its associated side aperture.

8. In a decorative wreath the improvement of claim 1 wherein said wire material is of wavy form at said other end of the core element and the sleeve is proportioned to receive said wavy form while holding the same against rotation relative to the sleeve with said projection in alignment with said side aperture.

* * * * *